Patented Dec. 6, 1938

2,139,109

UNITED STATES PATENT OFFICE 2,139,109

PRODUCTION OF IRON OXIDE AND ZINC SULPHATE

Joseph W. Ayers, Easton, Pa., assignor to C. K. Williams & Co., Easton, Pa., a corporation of Pennsylvania No Drawing. Application June 26, 1935, Serial No. 28,453

4 Claims. (Cl. 23—125)

This invention relates to the production of iron oxide and zinc sulphate suitable for use in the preparation of pigments.

In a copending application of Carl R. C. C. Wespy, Serial No. 561,996, filed September 9, 1931, now Patent No. 2,007,233, assigned to the owner of the present application, there is described a process for the manufacture of iron oxide and zinc sulphate from ferrous sulphate and zinc oxide, or zinc containing materials, in which the ferrous sulphate and the zinc oxide, or other zinc containing materials, are calcined at a temperature of about 650 to 750° C. under conditions which bring about a transfer of the sulphur trioxide radical from the ferrous sulphate to the zinc oxide containing material and thereby simultaneously produce an iron oxide suitable for pigment purposes and zinc sulphate, without the loss of any sulphur such as occurs in the usual method of manufacture of synthetic iron oxide colors under heat.

I have discovered that clearer and better oxides can be produced and higher yields obtained with greater efficiency in the operation of the calcining furnaces, if instead of using ferrous sulphate, as specified in the said application of Carl R. C. C. Wespy, the ferrous sulphate is first converted by heating or calcination substantially into ferric sulphate and the resulting ferric sulphate mass heated with zinc oxide, or other zinc containing materials, to bring about the transfer of the sulphur trioxide to the zinc and the production of ferric oxide.

When zinc oxide is heated with ferrous sulphate as described in said prior application to yield ferric oxide and zinc sulphate, two reactions are possible, depending upon whether air is present or not. When air is present the reaction is as represented by the equation (a) and when not, the reaction is as represented by the equation (b).

(a) $4ZnO + 4FeSO_4.H_2O + O_2 \rightarrow$
$\quad\quad 4ZnSO_4 + 2Fe_2O_3 + 4H_2O$ (b) $2FeSO_4.H_2O + ZnO \rightarrow$
$\quad\quad Fe_2O_3 + ZnSO_4 + SO_2 + 2H_2O$ When working according to the Wespy process as described in the above noted application, it has been found that even though air is admitted to the charge in the furnace, sulphur dioxide is nevertheless evolved, apparently because the oxygen or air does not penetrate through the charge in the furnace thereby causing both of the reactions above noted to take place.

Complete transfer of the sulphur or sulphur trioxide to the zinc oxide in the reaction is obviously a material saving in expense of operation. The sulphur dioxide, however, formed in reaction (b) will not react with the zinc oxide to form zinc sulphate, but will leave the furnace in the form of gas and be lost. When reaction (a) above takes place, for every 100 parts of $FeSO_4.H_2O$ used, 93 parts of zinc sulphate and 47.02 parts of ferric oxide are formed. However, when reaction (b) takes place, about one-half of the sulphur is lost so that from 100 parts of $FeSO_4.H_2O$ only 47.5 parts of zinc sulphate are formed.

I have found that if the ferrous sulphate used as the initial material in the process of the said Wespy application is first converted substantially to ferric sulphate before mixing and calcining with the zinc oxide, or other zinc oxide containing material, practically complete transfer of the sulphur trioxide with formation of zinc sulphate may be obtained in the furnace without admission of air, for the most part in accordance with the following reaction:

$$Fe_2(SO_4)_3 + 3ZnO = Fe_2O_3 + 3ZnSO_4$$

All of the sulphur present is converted into zinc sulphate and there is no liberation of sulphur dioxide gas.

In addition to the greater recovery of the sulphur when the ferrous sulphate is first converted into ferric sulphate, the yield of ferric oxide from the furnace product is about 96.65% whereas, if ferrous sulphate is not converted into ferric sulphate prior to calcination with the zinc oxide, the yield of ferric oxide is only 89.5 to 90%. Furthermore, the ferric sulphate which has been previously produced by calcination of the ferrous sulphate is substantially free from water of hydration and therefore does not cake or fuse in the furnace which makes for better plant operation.

The iron oxides made in accordance with the present invention from the ferric sulphate have a brighter and clearer color, and a higher tinting strength than those produced from ferrous sulphate.

In carrying out my invention according to a preferred embodiment, ferrous sulphate

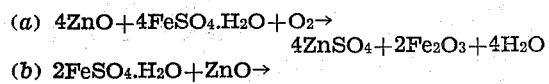

($FeSO_4.7H_2O$)

is calcined at a temperature approximating 1000–1700° F. in the presence of oxygen and converted to ferric sulphate and other compounds in about the following proportions:

| | Per cent |
|---|---|
| $Fe_2(SO_4)_3$ | 65.7 |
| $Fe_2O_3$ | 30.65 |
| $FeSO_4.H_2O$ | 4.66 |

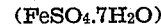

The invention in its broader aspects is not in any sense limited to calcination as the method of obtaining the ferric sulphate nor to the described temperature of calcination, for any source of such compound is satisfactory from the point of view of operability.

The ferric sulphate composition formed by the above calcination treatment is then mixed with zinc oxide, or other zinc containing material, preferably in molecular combining proportions of ferric sulphate and zinc oxide, although a slight excess of either zinc oxide or ferric sulphate may be used. The ferric sulphate-zinc oxide mixture is then charged into a furnace, preferably of the rotating type, and calcined at a temperature range of from 1000 to 1700° F., the particular temperature employed being dependent upon the shade and hue of oxide desired. After the calcining operation is complete, the zinc sulphate is leached from the ferric oxide and the ferric oxide when washed free of the sulphate is filtered, dried and pulverized for use as a pigment.

The zinc sulphate solution may be heated to crystallize out the zinc sulphate before shipment or may be used in solution for the production of other pigments such as lithopone, for example. Alternatively, the zinc sulphate may be heated to form zinc oxide and sulphur trioxide ($SO_3$), which sulphur trioxide gas may be passed through water to regenerate sulphuric acid suitable for use, if so desired, in the production of further amounts of ferrous sulphate from scrap iron somewhat in accordance with the following reactions:

1. $ZnSO_4 + heat = ZnO + SO_3$
2. $H_2O + SO_3 = H_2SO_4$
3. $H_2SO_4 + Fe = FeSO_4 + H_2$ Through this series of reactions a cyclic process is obtained wherein only small operating losses occur, such series constituting an additional embodiment of the present invention. The following equations represent the reactions which complete the cycle:

4. $12FeSO_4 + 3O_2 \rightarrow 4Fe_2(SO_4)_3 + 2Fe_2O_3$
5. $Fe_2(SO_4)_3 + 3ZnO \rightarrow Fe_2O_3 + 3ZnSO_4$ Since that portion of the cyclic process represented by the Equations 1 to 3 inclusive is independent of the subsequent method by which the $Fe_2O_3$ and $ZnSO_4$ are produced, the present invention includes the cyclic process in which the $FeSO_4$ itself in admixture with the ZnO is calcined.

Instead of using ferric sulphate in the process herein described, ferric chloride may be employed in substantially the same way by mixture with zinc oxide to produce ferric oxide and zinc chloride.

Although the conversion of the ferrous sulphate to ferric sulphate prior to mixing and calcination of the zinc oxide introduces an additional step into the process described in the Wespy application, my process as herein described is more economical because of the greater yield of zinc sulphate and the better or greater ease of operation of the furnaces during the calcination of the ferric sulphate and zinc oxide.

Various modifications may be made in the above described preferred procedure without departing from the spirit of my invention or the terms of the appended claims.

I claim:

1. In the production of synthetic iron oxide pigments from iron sulphate, the method which comprises converting ferrous sulphate into ferric sulphate, mixing the ferric sulfate with zinc oxide containing material, and calcining the mixture at a temperature of from 1000 to 1700° F. to convert the ferric sulphate to ferric oxide and the zinc oxide to zinc sulphate, and leaching the zinc sulphate from the furnace product.

2. As a new product of manufacture an iron oxide suitable for pigment purposes having a bright color and high tinting strength made by converting ferrous sulphate into ferric sulphate, mixing the ferric sulphate with zinc oxide containing material, and calcining the mixture at a temperature of from 1000 to 1700° F. to convert the ferric sulphate to ferric oxide and the zinc oxide to zinc sulphate, and leaching the zinc sulphate from the furnace product.

3. The method of simultaneously producing zinc sulphate and iron oxide suitable for pigment purposes from zinc containing material and ferric sulphate without material loss of the sulphur, which comprises converting ferrous sulphate into ferric sulphate, mixing raw materials containing zinc oxide with approximately combining equivalent amounts of the ferric sulphate, thereafter heating the material to a temperature of from 1000° to 1700° F. which brings about a transfer of substantially the whole sulphur content from the iron sulphate to the zinc oxide to produce zinc sulphate and under conditions which produce iron oxide suitable for pigment purposes, and separating the zinc sulphate from the iron oxide.

4. The cyclic process of producing ferric oxide comprising oxidizing ferrous sulphate thereby producing substantially anhydrous ferric sulphate, mixing zinc oxide with said ferric sulphate, calcining said mixture at a temperature of from 1000 to 1700° F. thereby producing ferric oxide and zinc sulphate, removing the ferric oxide, heating the remaining zinc sulphate thereby producing zinc oxide and sulphur trioxide, adding water to the sulphur trioxide thereby forming sulphuric acid, treating iron with said sulphuric acid thereby producing ferrous sulphate, oxidizing, mixing with zinc oxide formed in the process, and repeating the cycle of steps herein specified.

JOSEPH W. AYERS.